(12) United States Patent
Andreas et al.

(10) Patent No.: US 6,901,558 B1
(45) Date of Patent: May 31, 2005

(54) SYSTEM AND METHOD FOR DISPLAYING STATUS OF BACKGROUND WORKER THREADS

(75) Inventors: William S. Andreas, Sudbury, MA (US); Jeffrey P. Foster, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/045,920

(22) Filed: Jan. 9, 2002

(51) Int. Cl.[7] .............................................. G09G 5/00
(52) U.S. Cl. .................. 715/772; 715/808; 715/809; 715/779; 715/783; 715/739; 715/740; 715/744
(58) Field of Search ................................. 715/772, 808, 715/809, 779, 783, 739, 740, 741, 742, 743, 744

(56) References Cited

U.S. PATENT DOCUMENTS 6,639,687 B1 * 10/2003 Neilsen ..................... 358/1.14

2001/0055017 A1 * 12/2001 Ording ....................... 345/440

* cited by examiner

*Primary Examiner*—Ba Huynh
*Assistant Examiner*—Mylinh T Tran
(74) *Attorney, Agent, or Firm*—Shelley M. Beckstrand; Stephen T. Keohane

(57) ABSTRACT

A system for displaying the status of a plurality of threaded tasks operating in the background includes a status bar; a progress control bar in the status bar for a primary task operating in the background and including a progress bar and first and second action buttons; the progress bar visually representing progress of a primary background operation; the first action button being selectable by a user for initiating an action with respect to the primary background operation and the second action button being selectable by a user for alternately displaying and canceling a drop list of secondary progress control bars for secondary tasks also operating in the background.

20 Claims, 3 Drawing Sheets

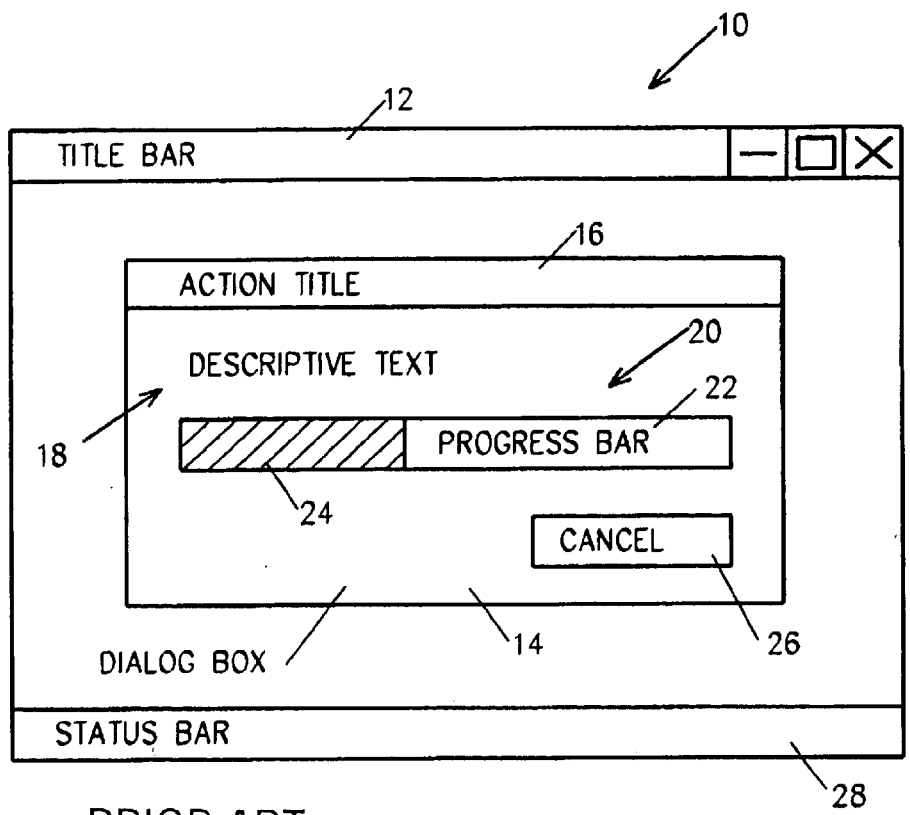
PRIOR ART  FIG. 1
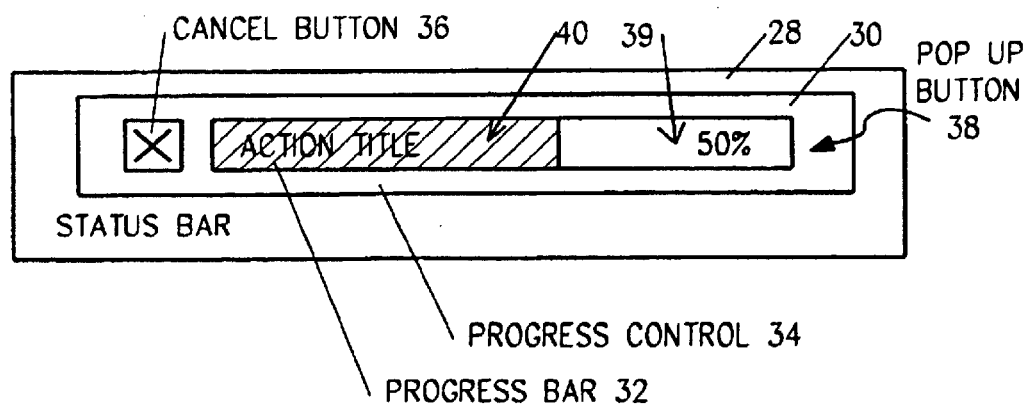
FIG. 2

SYSTEM AND METHOD FOR DISPLAYING STATUS OF BACKGROUND WORKER THREADS

BACKGROUND OF THE INVENTION

1. Technical Field of the Invention

This invention pertains to the status bar of a graphical user interface. More particularly, it relates to a status bar configured to display status and provide programmable control of tasks executing in the background.

2. Background Art

For operating systems that support multi-tasking, worker threads allow non-visual tasks to be run in the background, freeing up the application's user interface for more user operations. The Notes Client is such an operating system. Tasks are of two types: those associated with a window tab, and those that aren't. Examples of tasks or operations that use a multi-threaded back end include archive, database copy, replace design, refresh design, analyze, extract, and file detach.

Users typically need or desire to know the status of such tasks running in the background. Heretofore, this need has been accommodated by displaying a dialog box with a progress indicator on it for one or more background operations (also referred to as tasks). This solved the problem of keeping the user informed but does so in an obtrusive manner which did not lead the user to appreciate that additional operations could be performed. Often once a dialog box is displayed, the user waits for the operation to complete and the dialog box to be dismissed. In doing this, the user loses the power of background operations, whether be one or more such operations. There is a need in the art for the display of background status which is presented in a non-obtrusive way, and which leads the user to continue with the performance of tasks or operations in addition to those running in the background.

It is, therefore, an object of the invention to provide an improved system and method for displaying the status of tasks running in the background.

It is a further object of the invention to provide a system and method for displaying the status of background tasks in a non-obtrusive manner.

It is a further object of the invention to provide a system and method for displaying the status of a plurality of background worker threads in a non-obtrusive manner responsive to user request.

It is a further object of the invention to provide a system and method for displaying the status of one or more tasks running in the background in such a way as to lead the user to understand that additional tasks may be conducted in the foreground.

It is a further object of the invention to provide an improved system and method for showing a user that a task is executing in the background of which he should be aware and which may require action.

SUMMARY OF THE INVENTION

A system for displaying the status of tasks operating in the background includes a status bar; a progress control bar in the status bar including a progress bar and a first action button; the progress bar visually representing progress of a primary background operation; and the action button being selectable by a user for initiating an action with respect to the primary background operation.

In accordance with an aspect of the invention, there is provided a computer program product configured to be operable for displaying the status of tasks according to method steps including displaying in a progress control bar a progress bar and a first action button; the progress bar visually representing progress of a primary background operation; and the action button being selectable by a user for initiating an action with respect to the primary background operation.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a schematic representation of a dialog box in accordance with the prior art.

FIG. 2 is a schematic representation of a status bar illustrating a progress window in accordance with a preferred embodiment of the invention.

BEST MODE FOR CARRYING OUT THE INVENTION

Figure 3:
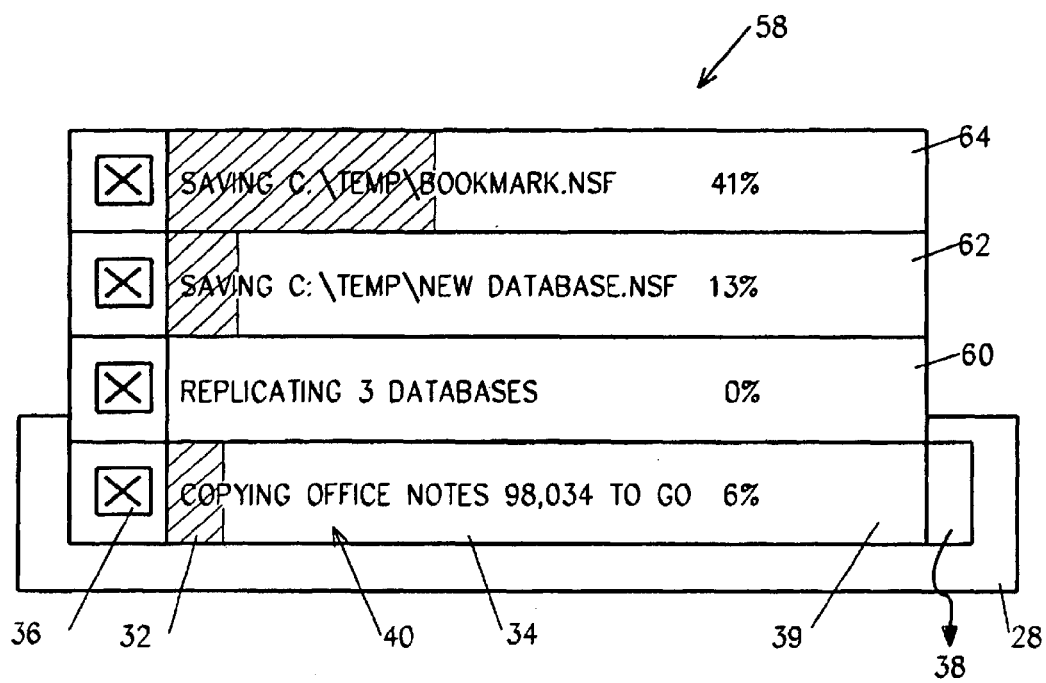
FIG. 3 is a schematic representation of a status bar illustrating a drop up stack of progress windows in accordance with a preferred embodiment of the invention.

In accordance with the preferred embdiments of the invention, the status of tasks running in the background is presented in a customizable and interactive status bar. Doing so has the usability advantage that the user is led to understand that multiple operations may be performed. A programmer that desires to display progress of a background task sends programmed commands for display in the status bar.

Referring to FIG. 1, a dialog box 14 is a framed window within an application window 10. Application window 10 typically includes a title bar 12 at the top and a status bar at the bottom.

Status bar 28 typically shows status such as "you have new mail", or an electric bolt that shows the application is 5 busy on the network, or the like. Historically, status bar 28 is a read-only display.

Dialog box typically includes a title 16, some descriptive text 18, a progress display 20 showing a progress indicator or bar 24, and one or more control buttons, such as cancel button 26. In order to do additional work in the foreground, however, the user must move dialog box 14 off to a corner of display 10, or displace dialog box 14 by clicking on an application behind it, in which case progress indicator 20 is lost to view.

For example, a user may receive an E-mail message with an attachment. The user may decide to save the attachment to disk, in which case the user selects a save action and specifies the path to the disk location to receive the attachment. The dialog box 14 pops into window display 10 to show the status of the save operation.

Referring to FIG. 2, in accordance with a preferred embodiment of the invention, status bar 28 is enhanced to include a progress bar 34 in the status bar 28 which includes a cancel button 36, a progress indicator 32, a title 40 inside of the progress bar 34 and a percent 39 in the title. Progress bar 34 may also include pop up button 38, which appears when a plurality of tasks are executing in the background. Cancel button may be clicked to stop the operation described by title 40.

Cancel button 36 can be used to stop whatever the background task is up to. In accordance with a more specific, alternative embodiment of the invention, double clicking, for example, on a progress bar 34 switches to the window it is associated with. Double clicking on a progress bar 34 that is not associated with a window opens a window if there is one that makes sense. For example, double clicking on the replicating bar 60 (FIG. 3) opens the replicator page.

Referring to FIG. 3, pop up button 38 may be selected to display in drop up 58 (drop up, because status bar 28 is at the bottom of display 10 in this exemplary embodiment) a stack 58 of progress controls (aka progress windows) 60, 62, and 64, one for each task which is executing the background. Each of progress windows 60, 62, and 64 includes a cancel button, progress bar and title, and percent completion display. With drop up 58 in view, pop up button 38 is reversed to point downward, and when selected results in removing stack 58 of progress windows 60, 62, and 64 from the display.

Figure 4:
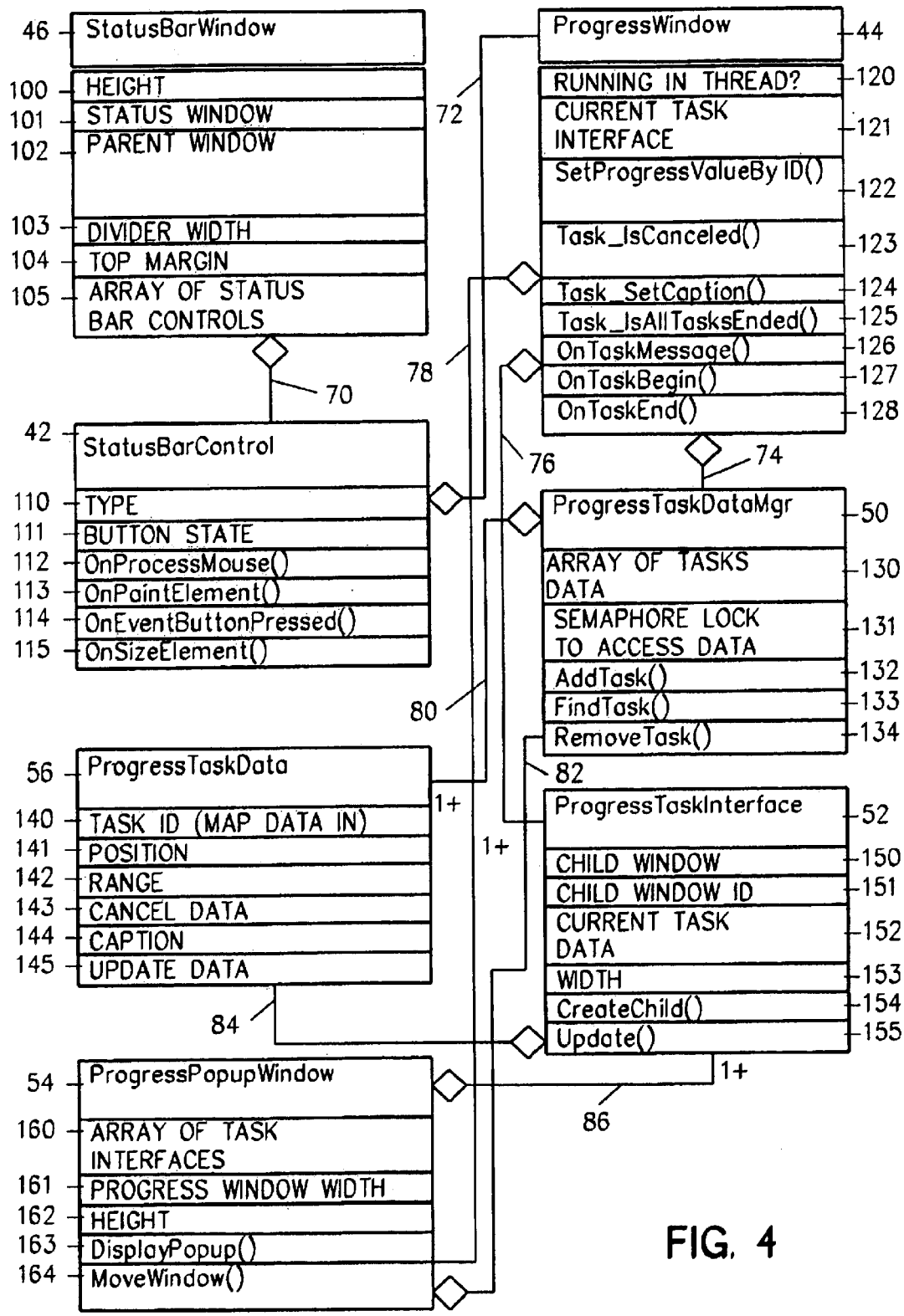
FIG. 4 is a C++ class diagram of an exemplary embodiment of the invention.

Referring to FIG. 4, a C++ object oriented class diagram illustrates an exemplary embodiment of the invention. The class relationships shown in FIG. 4 are aggregations where one class has another class as an attribute. When one class has another class, it can be a reference to the other object or an actual object. As is represented by line 70 StatusBarWindow class 46 has a StatusBarControl class 42. As represented by line 72, StatusBarControl 42 has a ProgressWindow class 44 when StatusBarControl 42 type is progress window. ProgressWindow 44, as are represented by lines 74, 76 and 78, has a ProgressTaskDataMgr class 50, one or more ProgressTaskInterface classes 52, and a ProgressPopupWindow class 54, respectively. As is represented by line 80, ProgressTaskDataMgr class 50 has one or more ProgressTaskData classes 56. As is represented by line 84, ProgressTaskInterface class 52 has a ProgresstaskData class 56. As is represented by lines 82 and 86, ProgressPopupWindow class 54 has a ProgressTaskDataMgr class 50 and one or more ProgressTaskInterface classes 52.

StatusBarWindow class 46 has class variables 100–104 and an array of status bar controls class variable 105, which is an array of StatusBarControl classes 42. Height 100 defines the height of status bar 28. Status window 101 defines status window 28 as a window of the operating system (Windows), and Parent window 102 identifies the parent of this window. Divider width 103 specifies the width of the divider between controls 36, 34 in the status bar which could include a progress window. Other possible controls are button, bitmap, text list, and the like. Top margin 104 specifies the distance between controls 36, 34 and the top of status bar 28.

StatusBarControl 42 has class variables type 110, button state 111, and procedures OnProcessMouse() 112, OnPaintElement() 113, OnEventButtonPressed() 114, and OnSizeElement() 115. Type 110 may be drop up list, progress window, bit map, or button. When type 110 is progress window, StatusBarControl class 42 has a ProgressWindow class 44. Button state 111 is used defining the appearance of status bar control 30, which changes appearance upon a mouse click in control 30. OnProcessMouse( ) procedure 112 processes all mouse operations. OnPaintElement() procedure 113 causes each element 36, 32, 34, etc. to paint itself into status bar 28. OnEventButtonPressed( ) procedure 114 causes execution of action appropriate to selection of various mouse controls (left click, right click, etc.) OnSizeElemento procedure 115 causes the various controls 36, 32, 34 to size themselves when status bar 28 is sized.

ProgressWindow class 44 includes class variables 120, 121 and procedures 122–128. Running in thread 120 is set when progress window 34 is used in a thread, and is used in updating the appearance of the user interface, which is rendered different if in a thread. Current task interface 121 identifies the primary task—the task which is displayed in progress control 34 in status bar 28. Tasks 60, 62, 64 which are not the primary task 34 are hidden unless rendered in stack 58. SetProgressValuebyID() procedure 122 defines the primary programmer interface. (If there is only one task executing the background, there will be only one ProgressTaskData class 56.) Task_IsCanceled() 123 checks if cancel button 36 has been clicked. Task_SetCaption() 124 writes caption 40 into progress bar 32. Title 40 is written into the area occupied also by progress bar 32 to save space, and yet is still rendered quite readable by selection of appropriate colors. Task_IsAllTasksEnded() 125 determines if progress window 44 is no longer needed. OnTaskMessage() 126 is generated when called by SetProgressValueByID() 122 to generate one of messages begin, set title, set range, set position, and end. OnTaskBegin() 127 responsive to a begin message instantiates. ProgressTaskData class 56 and ProgressTaskInterface class 52, and responsive to an end message OnTaskEnd() 128 terminates them.

ProgressTaskDataMgr class 50 provides a warehouse for task data, including array of task data 130, a semaphore lock 131 for avoiding thread collisions by restricting access to class 50 to one thread at a time, and AddTask() 132, FindTask() 133, and RemoveTask() 134 procedures, the functions of which are implicit in their names.

ProgressTaskData class 56 includes variables 140–145. Task ID 140 is used to map all incoming data. Position 141 defines the position of progress control 34 horizontally within status bar 28; range 142 defines the range of status values possible (and these may be converted to % for display as element 39); cancel data 143 is a flag set if this data is to be canceled; update data 145 is a flag set it this data is to be updated; and caption 144 specifies progress title 40. ProgressTaskInterface class 52 defines the user interface display 34 of a task. If this task is canceled, class 52 is canceled and a new instantiation created for the next task in the stack of tasks working in the background. Class 52 includes variables child window 150, child window ID 151, current task data 152, and width 153 and procedures CreateChild() 154 and Update() 155, which checks task data to see if the UI needs updating.

ProgressPopupWindow class 54 includes variables array of task interfaces 160, progress window width 161 of progress control 34 and its height 162. DisplayPopup() procedure 163 controls popup display 38, and MoveWindow() procedure 164 positions and sizes controls 34, 60, 62, 64 for the optimum view.

Advantages over the Prior Art

It is an advantage of the invention that there is provided an improved system and method for displaying the status of tasks running in the background.

It is a further advantage of the invention that there is provided a system and method for displaying the status of background tasks in a non-obtrusive manner.

It is a further advantage of the invention that there is provided a system and method for displaying the status of a plurality of background tasks in a non-obtrusive manner responsive to user request.

It is a further advantage of the invention that there is provided a system and method for displaying the status of one or more tasks running in the background in such a way as to lead the user to understand that additional tasks may be conducted in the foreground.

It is a further advantage of the invention that there is provided an improved system and method for showing a user that a task is executing in the background of which he should be aware and which may require action.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the progress control 34 has been described as preferably contained within the window or frame that is status bar 28, and stack 58 popped up from status bar 28, these primary control and stack of secondary controls could be housed in some other location. What is required is a "something is going on in the background" indicator and preferably a cancel control for all background operations, such as attaching/deattaching several attachments, replicating, loading a page, checking-for-mail, and so forth.

Accordingly, the scope of protection of this invention is limited only by the following claims and their equivalents.

We claim:

1. A method for displaying the status of tasks, comprising the step of:
   displaying in a progress control bar a progress bar and a first action button;
   said progress bar visually representing progress of a primary background operating;
   said action button selectable by a user for initiating an action with respect to said primary background operation;
   executing at least one secondary background operation;
   displaying a second action button in said progress control bar; and
   responsive to user selection of said second action button, displaying a drop list of second progress control bars, with one second progress control bar for each said secondary background operation.

2. The method of claim 1, further comprising the step of displaying said progress control bar in a status bar.

3. The method of claim 2, further comprising the step of overwriting said progress bar with a caption describing said primary background operation.

4. The method of claim 2, further comprising the step responsive to user selection of said action button of halting said primary background operation.

5. The method of claim 1, further comprising the step responsive to a subsequent user selection of said second action button of collapsing said drop list.

6. The method of claim 5, further comprising the steps of:
   responsive to said primary operation completing or being canceled, replacing said progress control bar in said status bar for said primary operation with a progress control bar for a secondary operation.

7. The method of claim 1, each said second progress control bar including for a corresponding secondary background operation an action button and a caption overwriting a progress bar.

8. A method for displaying the status of a plurality of threaded tasks operating in the background, comprising the steps of:
   displaying in a status bar a progress control bar a progress bar and a first action button;
   said progress bar visually representing progress of a primary background operation;
   said action button selectable by a user for initiating an cancel action with respect to said primary background operation;
   overwriting said progress bar with a caption describing said primary background operation;
   executing at least one secondary background operation;
   displaying a second action button in said progress control bar;
   responsive to user selection of said second action button, displaying a drop list of second progress control bars, with one second progress control bar for each said secondary background operation and including a third cancel action button and a corresponding caption overwriting a corresponding progress bar;
   responsive to a subsequent user selection of said second action button, collapsing said drop list; and
   responsive to said primary operation completing or being canceled, replacing said progress control bar in said status bar for said primary operation with a progress control bar for a secondary operation.

9. System for displaying the status of tasks operating in the background, comprising:
   a status bar;
   a progress control bar in said status bar including a progress bar and a first action button;
   said progress bar visually representing progress of a primary background operating;
   said action button selectable by a user for initiating an action with respect to said primary background operation; and
   a second action button in said progress control bar responsive to user selection for alternately displaying and collapsing a drop list of second progress control bars, with one second progress control bar for each of one or more secondary background operations.

10. The system of claim 9, said progress control bar further comprising a caption overwriting said progress bar for describing said primary background operation.

11. The system of claim 9, said action button being responsive to user selection for halting said primary background operation.

12. The system of claim 9, each said second progress control bar including for a corresponding secondary background operation an action button and a caption overwriting a progress bar.

13. A program storage device readable by a machine, tangibly embodying a program of instructions executable by a machine to perform method steps for displaying the status of tasks, said method steps comprising:

displaying in a progress control bar a progress bar and a first action button;

said progress bar visually representing progress of a primary background operating;

said action button selectable by a user for initiating an action with respect to said primary background operation;

executing at least one secondary background operation;

displaying a second action button in said progress control bar; and responsive to user selection of said second action button, displaying a drop list of second progress control bars, with one second progress control bar for each said secondary background operation.

14. The program storage device of claim 13, said method steps further comprising displaying said progress control bar in a status bar and overwriting said progress bar with a caption describing said primary background operation.

15. The program storage device of claim 14, said method steps further comprising the step responsive to user selection of said action button of halting said primary background operation.

16. The program storage device of claim 13, said method steps further comprising the step responsive to a subsequent user selection of said second action button of collapsing said drop list.

17. The program storage device of claim 16, said method steps further comprising the steps of:

responsive to said primary operation completing or being canceled, replacing said progress control bar in said status bar for said primary operation with a progress control bar for a secondary operation.

18. The program storage device of claim 13, each said second progress control bar including for a corresponding secondary background operation an action button and a caption overwriting a progress bar.

19. A computer program product or computer program element for displaying the status of tasks according to method steps comprising:

displaying in a progress control bar a progress bar and a first action button;

said progress bar visually representing progress of a primary background operating;

said action button selectable by a user for initiating an action with respect to said primary background operation;

executing at least one secondary background operation;

displaying a second action button in said progress control bar; and responsive to user selection of said second action button, displaying a drop list of second progress control bars, with one second Progress control bar for each said secondary background operation.

20. A system for displaying the status of a plurality of threaded tasks operating in the background, comprising a status bar; a progress control bar in the status bar for a primary task operating in the background and including a progress bar and first and second action buttons; the progress bar visually representing progress of a primary background operation; said first action button being selectable by a user for initiating an action with respect to said primary background operation and collapsing a drop list of secondary progress control bars for secondary tasks also operating in the background.

* * * * *